United States Patent
Okazaki et al.

(10) Patent No.: US 6,718,131 B2
(45) Date of Patent: Apr. 6, 2004

(54) VIBRATION PREVENTING DEVICE AND BLUR CORRECTING DEVICE

(75) Inventors: Mitsuhiro Okazaki, Setagaya-ku (JP); Kazutoshi Usui, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/359,129

(22) Filed: Feb. 6, 2003

(65) Prior Publication Data

US 2004/0022530 A1 Feb. 5, 2004

(30) Foreign Application Priority Data

Feb. 8, 2002 (JP) ........................ 2002-031895

(51) Int. Cl.$^7$ .............. G03B 5/00; G02B 27/64
(52) U.S. Cl. ........................ 396/55; 359/557
(58) Field of Search ............. 396/52, 55; 359/554–557; 348/208.11

(56) References Cited

U.S. PATENT DOCUMENTS

| | | | |
|---|---|---|---|
| 5,717,960 A | 2/1998 | Tomita et al. | 396/55 |
| 5,881,325 A * | 3/1999 | Imura et al. | 396/55 |
| 5,974,270 A | 10/1999 | Imura et al. | 396/55 |
| 6,029,009 A | 2/2000 | Imura | 396/55 |
| 6,035,131 A * | 3/2000 | Washisu | 396/55 |
| 6,064,827 A * | 5/2000 | Toyoda | 396/55 |
| 6,400,902 B1 | 6/2002 | Usui | 396/55 |

FOREIGN PATENT DOCUMENTS

| | | | |
|---|---|---|---|
| JP | A 09-080583 | 3/1997 | G03B/9/10 |
| JP | A 09-138434 | 5/1997 | G03B/5/00 |
| JP | A 10-003103 | 1/1998 | G03B/5/00 |
| JP | A 10-039352 | 2/1998 | G03B/5/00 |
| JP | A 11-174512 | 7/1999 | G03B/5/00 |

* cited by examiner

*Primary Examiner*—W. B. Perkey
(74) *Attorney, Agent, or Firm*—Oliff & Berridge, PLC

(57) ABSTRACT

A blur correcting device comprises: a blur correction optical system that corrects an image blur by moving along a direction extending substantially perpendicular to an optical axis; a movable member that includes the blur correction optical system and moves together with the blur correction optical system; a blur correction drive unit that drives the movable member; and a pressure member that applies pressure to the movable member in a direction extending substantially along the optical axis of the blur correction optical system, and switches between a state in which the pressure is applied to the movable member and a state in which no pressure is applied to the movable member by moving within a plane substantially perpendicular to the optical axis.

16 Claims, 8 Drawing Sheets

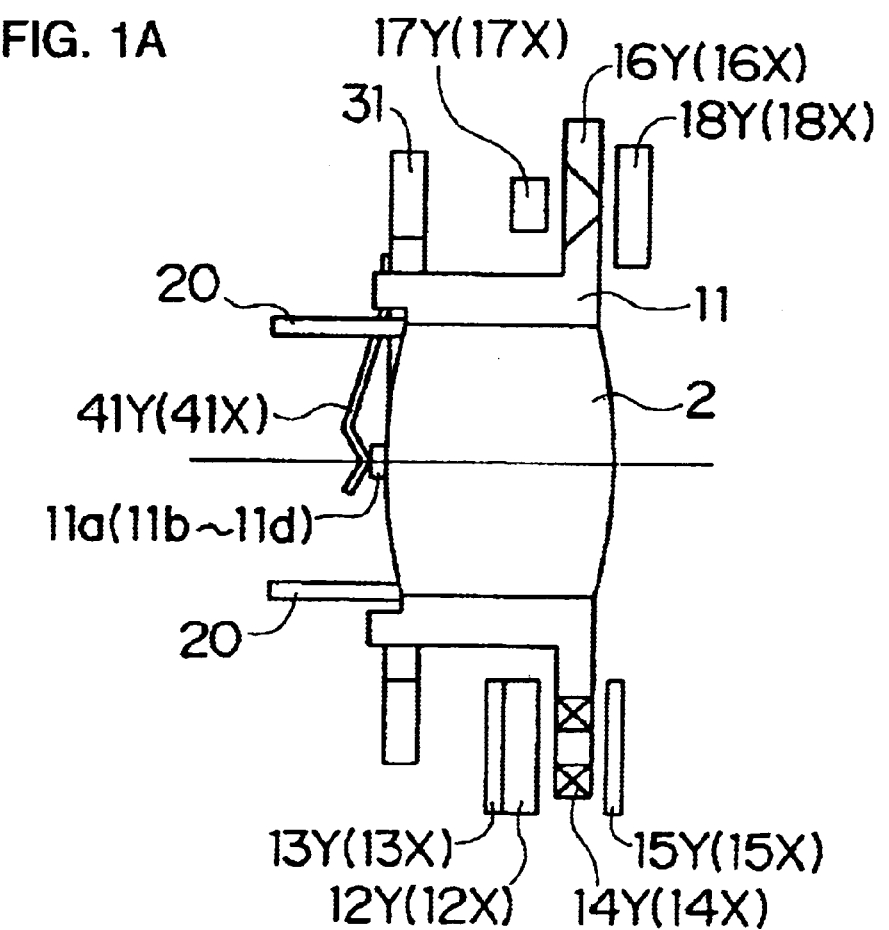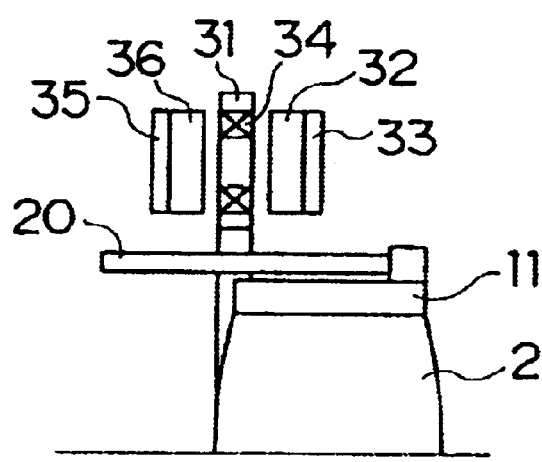

VIBRATION PREVENTING DEVICE AND BLUR CORRECTING DEVICE

INCORPORATION BY REFERENCE

The disclosure of the following priority application is herein incorporated by reference:

Japanese Patent Application No. 2002-031895 filed Feb. 8, 2002.

BACKGROUND OF THE INVENTION

1. Field of the Invention

The present invention relates to a vibration preventing device that prevents a vibration of a member and a blur correcting device that corrects an image blur in a photographing apparatus or the like provided with the vibration preventing device.

2. Description of the Related Art

In a blur correcting device, a blur correction optical system which corrects an image blur by moving along a direction substantially perpendicular to the optical axis is provided at a movable member so that the blur correction optical system is made to move together with the movable member. In the device, smoother drive control can be achieved as the drive resistance of the movable member is lowered and, accordingly, Japanese Laid-Open Patent Publication No. H 9-80583 discloses a structure in which the movable member is supported by an elastic support member (wire).

In addition, such a device includes a locking member that restricts the movement range of the movable member to a locking range which is narrower than the blur correction control range of a blur correction drive unit when no blur correction control is implemented and thus, the position of the blur correction optical system is stabilized.

However, a certain degree of dimensional tolerance and the like must be assured in the device in the related art described above and, for this reason, a gap is formed between the movable member and the locking member. As a result, a slight mechanical vibration (e.g., a shock caused by the mirror, the shutter or the like in a single lens reflex camera) or the like in the photographing apparatus is transmitted and the movable member is allowed to move within the locking range even while it is in a locked state.

The movable member does not move readily due to a mechanical vibration or the like in the photographing apparatus in the related art during a photographing operation performed with the lens set horizontally, since the movable member moves downward under its own weight to come into contact with the locking member in this state. However, the movable member and the locking member do not come into contact with each other and thus, the movable member is caused to move readily by a mechanical vibration or the like during a photographing operation performed with the lens turned upward or downward.

In addition, there is a problem in that if the drive resistance of the movable member is lowered as described earlier in order to achieve better control on the movable member, the movable member becomes even more prone to move in response to a slight mechanical vibration or the like.

Since the blur correction optical system moves as well when the movable member moves as described above, the image quality becomes poor.

SUMMARY OF THE INVENTION

The present invention provides a vibration preventing device that enables a reliable lock of the movable member and a blur correcting device that employs this vibration preventing device.

A vibration preventing device according to the present invention comprises: a movable member capable of moving within a predetermined plane; a drive unit that drives the movable member to move within the predetermined plane; a restricting member that is set to either a first position at which movement of the movable member within the predetermined plane is physically enabled or to a second position at which the movement of the movable member within the predetermined plane is restricted; and a pressure member that further prevents the movement of the movable member within the predetermined plane by applying pressure to the movable member along a direction substantially perpendicular to the predetermined plane while the movement of the movable member within the predetermined plane is restricted by the restricting member.

In this vibration preventing device, it is preferable that the pressure member is constituted of at least two elongated leaf springs, and that longitudinal directions of the two leaf springs are set along different directions from each other.

It is also preferable that the pressure member is constituted of a single leaf spring member; and the leaf spring member comprises a contact portion that comes into contact with the movable member, a first arm portion having one end thereof fixed to the restricting member and another end thereof connected to the contact portion, that functions as a leaf spring, and a second arm portion having one end thereof fixed to the restricting member and another end thereof connected to the contact portion, that functions as a leaf spring and is set in a direction extending substantially perpendicular to the first arm portion.

It is also preferable that the restricting member is set to the first position or the second position as the restricting member itself moves; and the pressure member is fixed to the restricting member, is caused to move as the restricting member moves, applies pressure to the movable member when the restricting member is set at the second position, and releases the pressure to the movable member when the restricting member is set at the first position.

A blur correction optical system may be further provided that corrects an image blur by moving along a direction extending substantially perpendicular to an optical axis, and it is preferable that the blur correction optical system is mounted at the movable member and is driven by the drive unit so as to move along the direction extending substantially perpendicular to the optical axis; the restricting member allows movement of the blur correction optical system when set at the first position and restricts the movement of the blur correction optical system when set at the second position; and the pressure member further prevents the movement of the blur correction optical system along the direction extending substantially perpendicular to the optical axis by applying pressure to the movable member along the optical axis while the movement of the blur correction optical system is restricted by the restricting member.

A blur correcting device according to the present invention comprises: a blur correction optical system that corrects an image blur by moving along a direction extending substantially perpendicular to an optical axis; a movable member that includes the blur correction optical system and moves together with the blur correction optical system; a blur correction drive unit that drives the movable member; and a pressure member that applies pressure to the movable member in a direction extending substantially along the optical axis of the blur correction optical system, and switches between a state in which the pressure is applied to the movable member and a state in which no pressure is applied to the movable member by moving within a plane substantially perpendicular to the optical axis.

In this blur correcting device, a locking member may be further provided that is capable of moving between a locking position at which a movement range of the movable member is restricted to a locking range narrower than a blur correction control range of the blur correction drive unit and a lock-release position at which the movement of the movable member is not restricted within the locking range, and it is preferable that the pressure member applies the pressure to the movable member when the locking member is at the locking position and does not apply any pressure to the movable member when the locking member is at the lock-release position. In this structure, it is preferable that the pressure member is fixed to the locking member and moves together as the locking member moves; and the movable member includes a pressure receiving portion that comes in contact with the pressure member when the locking member is at the locking position and is not in contact with the pressure member when the locking member is at the lock-release position. It is preferable that the pressure member is constituted of a single leaf spring member; and the leaf spring member includes a contact portion that comes into contact with the movable member, a first arm portion having one end thereof fixed to the locking member and another end thereof connected to the contact portion, which functions as a leaf spring, and a second arm portion having one end thereof fixed to the locking member and another end thereof connected to the contact portion, which functions as a leaf spring and is set in a direction extending substantially perpendicular to the first arm portion.

It is also preferable that the movable member is supported by a plurality of wire members; and the pressure member applies the pressure to the movable member in a direction along which the wire members are stretched.

It is also preferable that the movable member is supported by a plurality of sliding portions or a plurality of balls; and the pressure member applies the pressure to the movable member in a direction along which the pressure is also applied to the sliding portions or the balls.

It is also preferable that the pressure member achieves a degree of rigidity high enough to ensure that substantially no deformation is caused within the plane substantially perpendicular to the optical axis by a force resulting from friction occurring at a contact area where the pressure member comes into contact with the movable member.

The pressure member may includes at least two substantially strip shaped leaf springs; and longitudinal directions of the leaf springs constituting the pressure member are set along directions extending substantially perpendicular to each other.

In another aspect of the blur correcting device according to the present invention, it comprises: a blur correction optical system that corrects an image blur by moving along a direction extending substantially perpendicular to an optical axis; a movable member that includes the blur correction optical system and moves together with the blur correction optical system; a restricting member having a restricting portion for restricting movement of the blur correction optical system along the direction extending substantially perpendicular to the optical axis, that is capable of moving between a restricting position at which the movement of the blur correction optical system is restricted and a non-restricting position at which the movement is not restricted; and a contact member provided at one of the movable member and the restricting member, that assumes a position at which the contact member comes into contact with the movable member or the restricting member where the contact member is not provided when the restricting member moves to the restricting position and assumes a position at which the contact is cleared when the restricting member moves to the non-restricting position.

A lens barrel according to the present invention comprises a vibration preventing device or a blur correcting device described above.

A camera according to the present invention comprises a vibration preventing device or a blur correcting device described above.

BRIEF DESCRIPTION OF THE DRAWINGS

FIGS. 1A and 1B present sectional views of the blur correcting device according to the present invention achieved in a first embodiment;

DESCRIPTION OF THE PREFERRED EMBODIMENTS

The following is a detailed explanation of the embodiments of the present invention, given in reference to the drawings and the like.

First Embodiment

Figure 2:
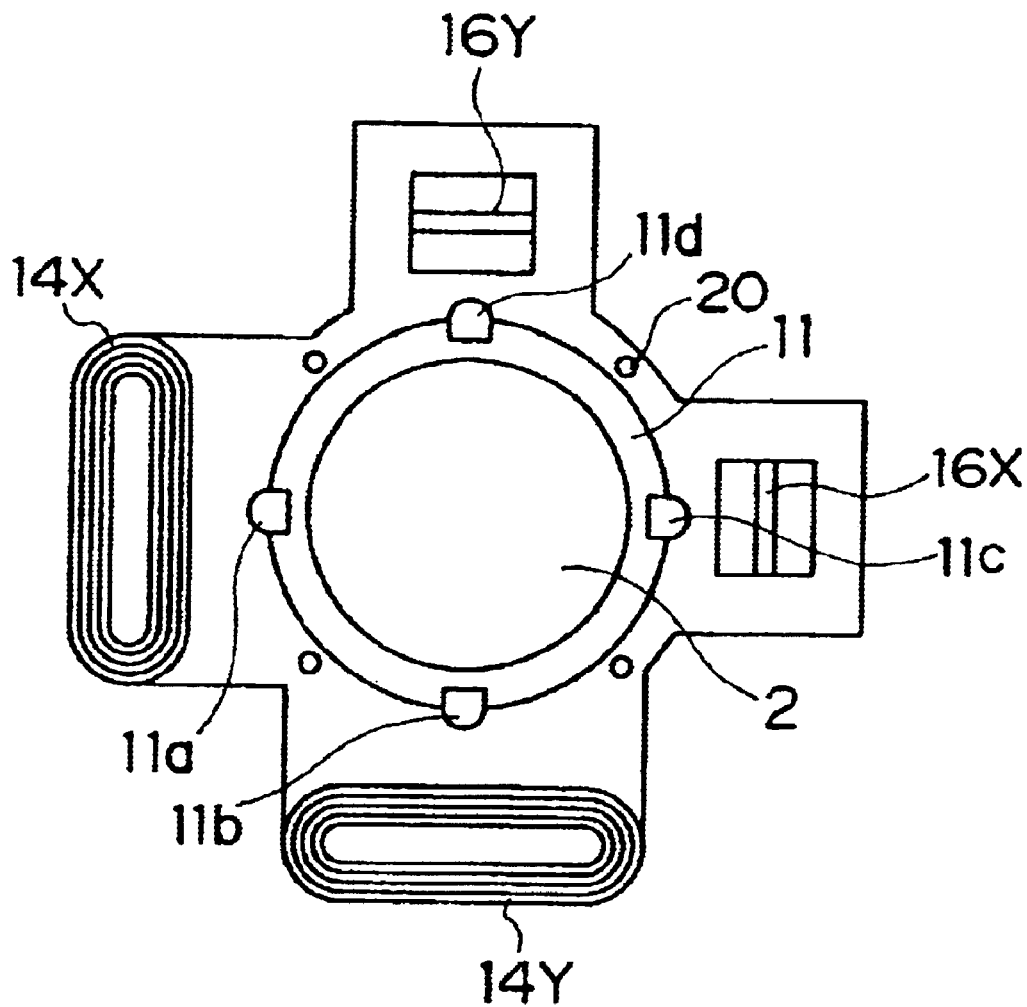
FIG. 2 shows the members provided at the movable member 11 in the first embodiment.
Figure 8:
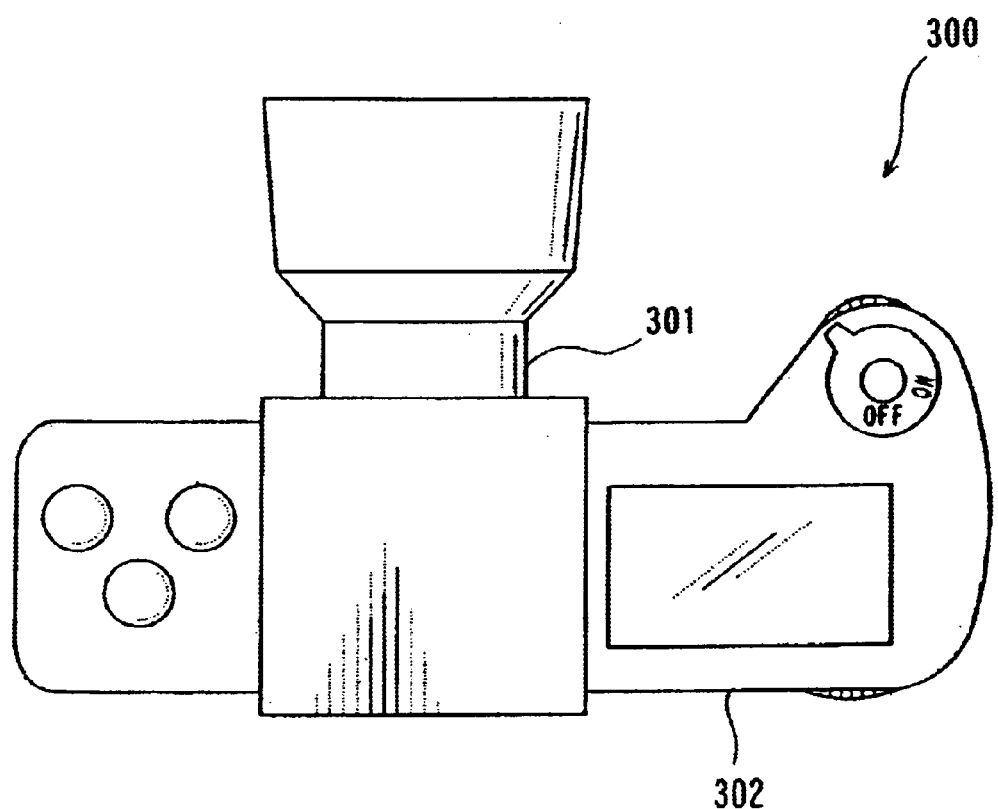
FIG. 8 is a top view of a camera that employs the blur correcting device.

FIGS. 1A and 1B are sectional views of the blur correcting device according to the present invention, achieved in the first embodiment. FIG. 2 shows the members provided at a movable member 11 in the embodiment. FIG. 8 is a top view of a camera 300 that employs the blur correcting device.

The blur correcting device in the embodiment, which is provided as an internal component in a lens barrel 301 used in the camera 300, includes a blur correction lens 2, the movable member 11, a voice coil motor (hereafter referred to as a VCM) for blur correction that generates a drive force along the pitching and yawing directions, a displacement detection device that detects a displacement of the movable member 11, a locking mechanism for locking the movable member 11 and the like. The lens barrel 301 is mounted and fixed onto a camera main body 302 in the form of an interchangeable lens. It is to be noted that the lens barrel 301 may be permanently fixed to the camera main body 302 in the form of a non-interchangeable lens unit.

It is to be noted that while two sets each constituted with one blur correction VCM and one displacement detection device are provided along two directions (an X direction and a Y direction) which extend perpendicular to the optical axis and also extend perpendicular to each other, the explanation is provided in reference to one set since the two sets are used in identical operations except that they operate along different directions.

The blur correction lens 2 is a blur correction optical system which corrects an image blur by moving along a direction substantially perpendicular to the optical axis and is fixed to the movable member 11.

The movable member 11, which moves together with the blur correction lens 2, includes coils 14X and 14Y and slits 16X and 16Y. In addition, projecting portions 11a~11d are formed at the movable member 11. Four line members, i.e., wires 20, are connected to the movable member 11 so that the movable member 11 is supported by a frame member (not shown) via the wires 20.

The blur correction VCM, which includes the coil 14Y (14X), a magnet 12Y (12X), a first yoke 13Y (13X) and a second yoke 15Y (15X), constitutes a blur correction drive unit that drives the movable member 11 along the Y direction (X direction). The magnet 12Y (12X), the first yoke 13Y (13X) and the second yoke 15Y (15X) are fixed to a frame member (not shown).

The displacement detection device comprising an LED 17Y (17X), the slit 16Y (16X) and a PSD (semiconductor image position sensing device) 18Y (18X), is a sensor which detects displacement of the movable member 11 along the Y direction (X direction). The LED 17Y (17X) and the PSD 18Y (18X) are fixed to a frame member (not shown).

Figure 3A:
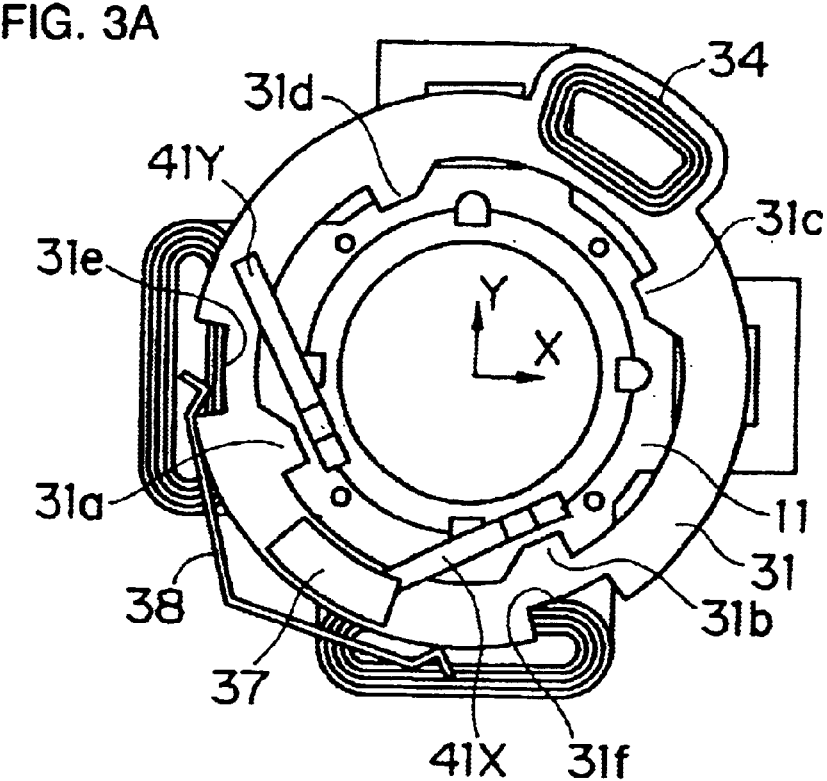
FIGS. 3A and 3B illustrate the locking mechanism achieved in the first embodiment.
Figure 3B:
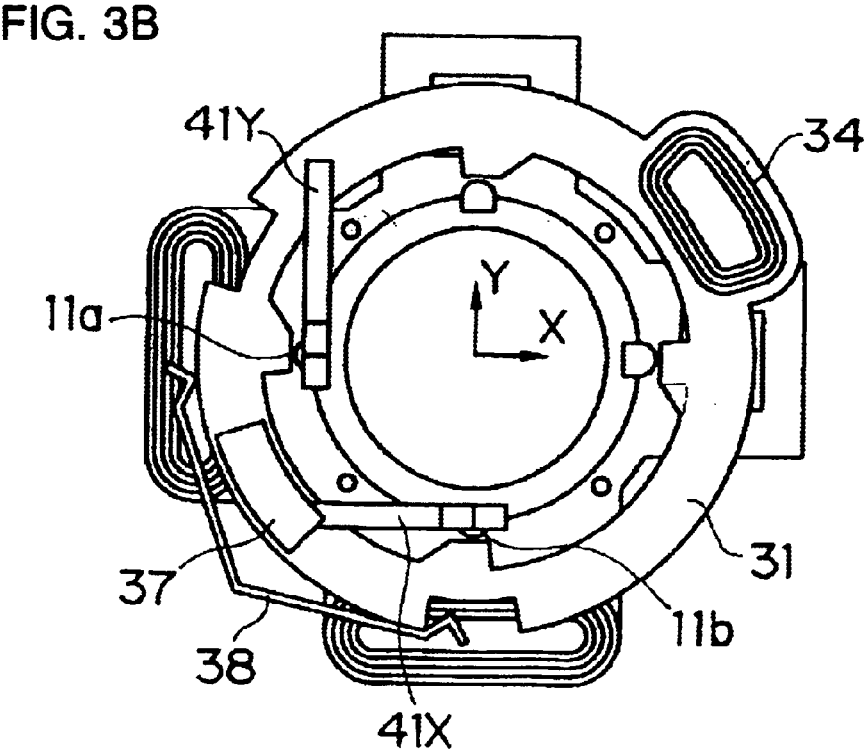

FIGS. 3A and 3B illustrate the locking mechanism achieved in the embodiment. FIG. 3A shows a lock-released state whereas FIG. 3B shows a locked state.

The locking mechanism achieved in the embodiment includes a lock ring 31, a locking VCM (32, 33, 34, 35 and 36), a weight 37, a latch spring 38, bias springs 41X and 41Y and the like.

The lock ring 31 is a substantially annular member having movement range restricting portions 31a~31d and stepped portions 31e and 31f formed therein. It is a locking member allowed to rotate around the optical axis.

The locking VCM, which includes a first magnet 32, a first yoke 33, a coil 34, a second yoke 35 and a second magnet 36, is an actuator utilized to drive the lock ring 31.

While the first and second magnets 32 and 36 and the first and second yokes 33 and 35 are fixed to a frame member (not shown), the coil 34 is fixed to the lock ring 31.

As electric power is supplied to the coil 34, a drive force is generated at the locking VCM, causing the lock ring 31 to move between the locking position and the lock-release position in a forward or reverse rotation depending upon the direction in which the electric power has been applied so that the locked state and the lock-released state are switched over.

In the locked state, as the movement range restricting portions 31a~31b are set closer to the projecting portions 11a~11d, the movement range of the movable member 11 is physically or mechanically restricted to a range narrower than the blur correction control range of the blur correction VCM. As a result, a blur correction becomes prohibited. In the lock-released state, on the other hand, the movement range restricting portions 31a~31d move away from the projecting portion 11a~11d and thus, the restriction imposed in the locked state is no longer effective and the movable member 11 can be driven by the blur correction VCM within the blur correction control range. As a result, the blur correction is enabled. It is to be noted that the regulation on the rotational angle in the locked state and the lock-released state is achieved between the lock ring 31 and the frame member (not shown).

In addition, the latch spring 38 fixed to the frame member (not shown) is held at either of the two stepped portions 31e and 31f of the lock ring 31 to retain the lock ring 31 at a specific angular position (corresponding to the locked state or the lock-released state). As a result, even if the power supply to the coil 34 is cut off at the locking position or the lock-release position, the current position can be sustained.

The weight 37 is fixed on the lock ring 31 on the opposite side of the coil 34 with respect to a symmetric axis, i.e., the rotational center of the lock ring 31. The weight 37 is provided in order to set the gravitational center of the lock ring 31 closer to its rotational center. The weight 37 prevents movement of the lock ring 31 from the currently held position corresponding to either the locked state or the lock-released state even when the lens barrel 301 is subjected to an impact.

The bias springs 41X and 41Y are each constituted of a narrow rectangular (substantially formed as a strip) leaf spring and they are provided as a pressure member with the longitudinal direction of the leaf springs set so as to extend substantially perpendicular to each other.

In the lock-released state shown in FIG. 3A, the bias springs 41X and 41Y are not in contact with the movable member 11 and thus, they do not affect the movable member 11 at all. In the locked state shown in FIGS. 1A and 3B, however, the bias springs 41X and 41Y are in contact with the movable member 11 at the projecting portions 11a and 11b at which the pressure is applied by the springs. As a result, frictional force frictional resistance) can be generated along the direction in which the movable member 11 is allowed to move to prevent any vibration of the movable member 11.

It is to be noted that when the lock ring 31 makes a rotational movement from the lock-release position to the locking position, the movement range restricting portions 31a~31d are set close to the projecting portions 11a~11d and the movement of the movable member 11 is thus restricted, and then, the bias springs 41X and 41Y come into contact with the movable member 11. As a result, since the bias springs 41X and 41Y do not apply a force to the movable member 11 before the movement of the projecting portions 11a~11d become restricted by the movement range restricting portions 31a~31d, the movable member 11 is not displaced to a position outside the positional range corresponding to the locked state by such a force from the springs.

With the lock ring 31, the movement range of the locked movable member 11 can be restricted to a locking range narrower than the blur correction control range. However, due to the dimensional tolerance that must be assured for the lock ring 31 and the movable member 11 and also, the control error bound to occur in the centering control of the movable member 11 (the blur correction lens 2), a gap is present between the lock ring 31 and the movable member 11 even in the locked state. Accordingly, by applying pressure to the movable member 11 with the bias springs 41X and 41Y, even a slight vibration of the movable member 11 is prevented and a more reliable lock is achieved with the frictional force generated at the contact areas of the movable member 11 and the bias springs 41X and 41Y when the movable member 11 would otherwise vibrate in response to a vibration occurring at the shutter or the like in the embodiment.

If only a single bias spring, e.g., the bias spring 41X alone, is provided in this structure, a high degree of rigidity can be achieved along the X direction in FIG. 3A and 3B corresponding to the longitudinal direction of the bias spring 41X. Therefore, for a vibration along the X direction, the bias spring 41X does not become deformed by a force applied to the bias spring 41X along the X direction as a result of the friction at the contact area of the bias spring 41X and the projecting portion 11a of the movable member 11 to counter the movement of the movable member 11 along the X direction and thus, the vibration in the X direction can be effectively prevented. However, since the bias spring 41X itself does not have sufficient rigidity along the Y direction, a vibration along the Y direction causes flexure of the bias spring 41X and thus, a vibration of the movable member 11 can not be prevented. Accordingly, the bias springs 41X and 41Y are arranged so that their longitudinal directions extend substantially perpendicular to each other and a certain degree of rigidity, which is great enough to prevent deformation of the bias springs within a plane substantially perpendicular to the optical axis, is achieved with the two bias springs in the embodiment. As a result, regardless of the direction along which a vibration occurs, the movable member 11 itself is not allowed to vibrate.

In addition, in the embodiment, the bias springs 41X and 41Y apply pressure to the movable member 11 along the optical axis, i.e., along the direction extending perpendicular to the moving surface of the movable member 11. As a result, the stroke over which the bias spring 41X and 41Y need to flex can be reduced and a higher degree of freedom is afforded in design.

Furthermore, the bias springs 41X and 41Y are arranged so that they apply pressure along the direction in which the wires 20 are stretched. Since the wires 20 may become flexed and the position of the blur correction lens 2 may become offset along the optical axis if pressure is applied in the direction along which the wires 20 are compressed in a structure having the movable member 11 supported by the wires 20 as in the embodiment, it is desirable to apply pressure in the direction along which the wires 20 are stretched.

In the embodiment, a reliable lock of the movable member 11 is achieved and an image does not deteriorate even if a vibration upon a shutter release or the like occurs in the photographing apparatus. In addition, the bias springs 41X and 41Y constituted of leaf springs formed in a strip shape can be manufactured with ease.

It is to be noted that the movable member 11 is capable of moving relative to the lens barrel 301 along a direction perpendicular to the optical axis. While the lock ring 31 is held so as to be allowed to rotate relative to the lens barrel 301, it can be considered to be secured to the lens barrel 301 along the optical axis and the direction perpendicular to the optical axis. The lens barrel 301, in turn, is fixed to the camera main body 302. The lens barrel 301 fixed to the camera main body 302 means that it is also fixed (in position) to an imaging medium (film or image capturing element) in the camera. The bias springs 41X and 41Y are fixed to the lock ring 31. Thus, the movable member 11 is allowed to move relative to the imaging medium in the camera along the direction perpendicular to the optical axis. The bias springs 41X and 41Y make a rotational movement together with the lock ring 31 within the plane perpendicular to the optical axis and when the lock ring 31 is in a stationary state, the bias springs 41X and 41Y are held at fixed positions relative to the imaging medium in the camera along the direction perpendicular to the optical axis.

Second Embodiment

Figure 4A:
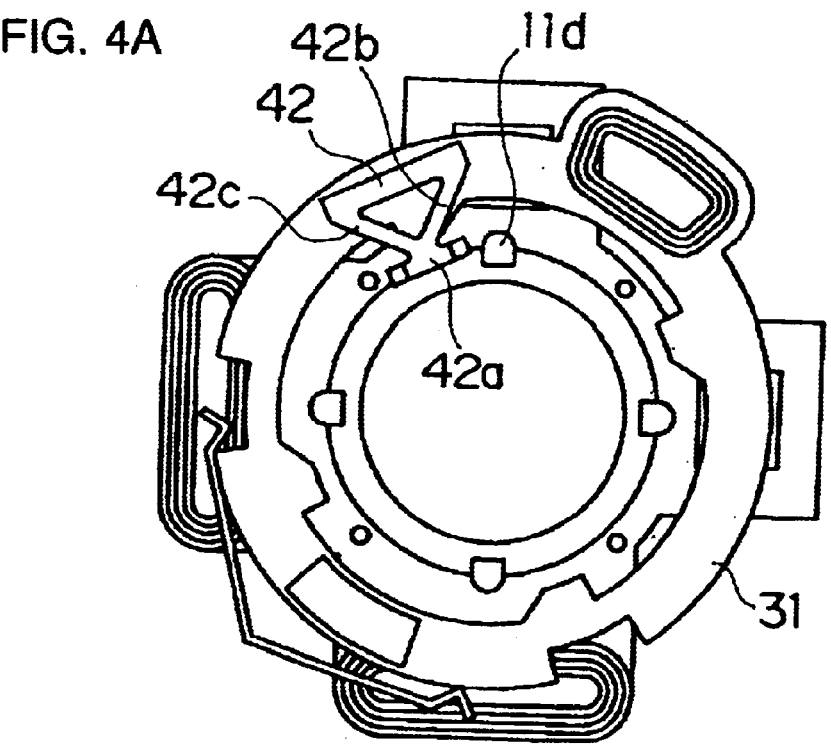
FIGS. 4A and 4B illustrate the locking mechanism achieved in a second embodiment.
Figure 4B:
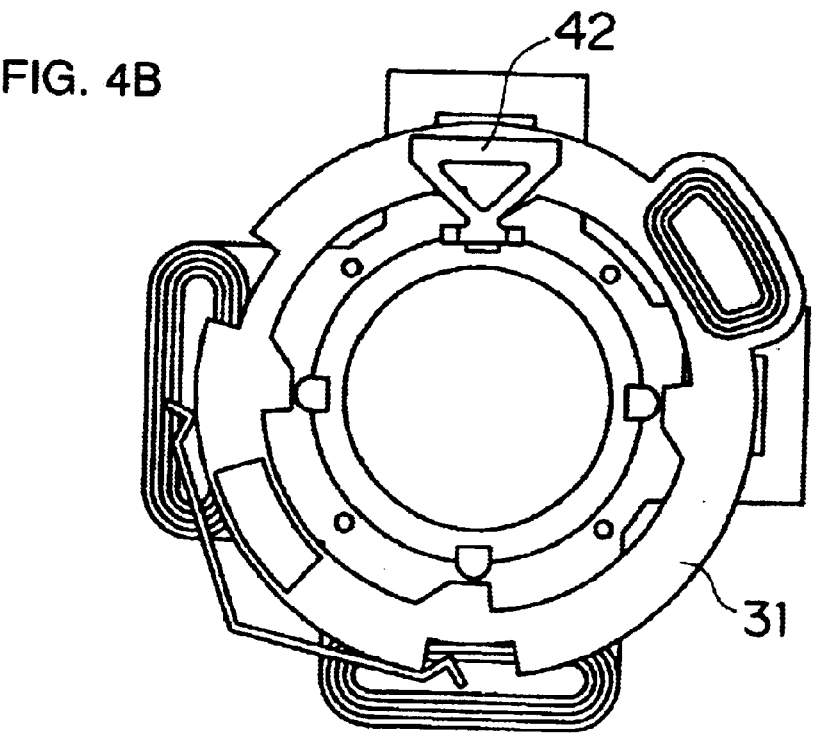

FIGS. 4A and 4B illustrate the locking mechanism achieved in the second embodiment. FIG. 4A shows the locking mechanism in the lock-released state, whereas FIG. 4B shows it in the locked state.

The embodiment differs from the first embodiment only in that a single bias spring 42 is provided instead of the bias spring 41X and 41Y and, for this reason, an explanation of the other identical features is omitted.

The bias spring 42 is constituted as a single leaf spring member that includes a contact portion 42a which comes in contact with the projecting portion 11d of the movable member 11 in the locked state, a first arm portion 42b having one end thereof fixed to the locking member 31 with another end thereof connected to the contact portion 42a, which functions as a plate spring, and a second arm portion 42c having one end thereof fixed to the locking member 31 and another end thereof connected to the contact portion 42a, which functions as a leaf spring and is provided along a direction substantially perpendicular to the direction in which the first arm portion 42b is provided.

Since the first arm portion 42b and the second arm portion 42c are set along directions perpendicular to each other, the bias spring 42 is not deformed regardless of which direction a force is applied to the contact portion 42a through the projecting portion 11d and thus, a vibration of the movable member 11 can be prevented.

In the embodiment, which achieves vibration prevention for the movable member 11 with a single bias spring 42, reductions in the number of required parts and in the number of assembly steps are realized.

Third Embodiment

Figure 5A:
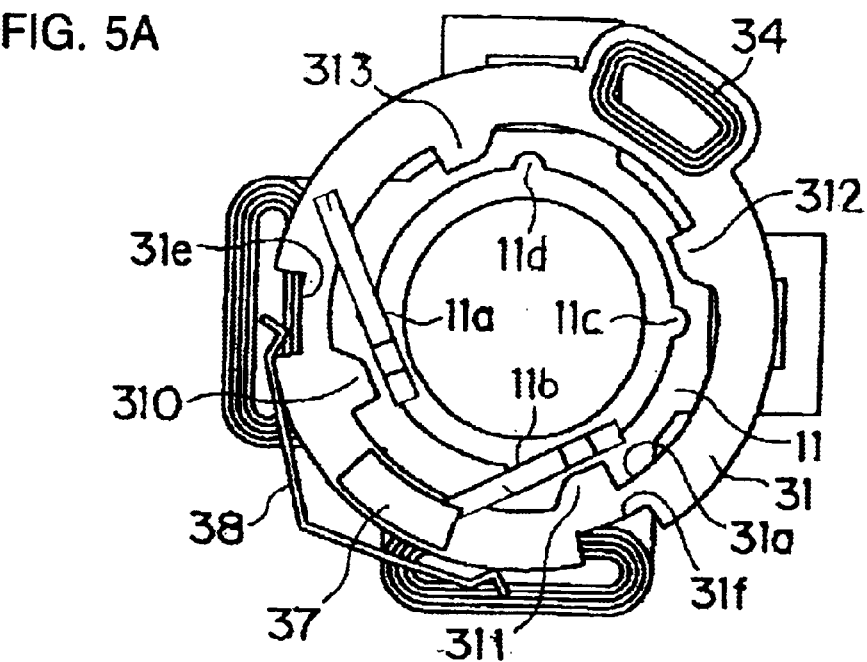
FIGS. 5A, 5B and 5C illustrate the locking mechanism achieved in a third embodiment.
Figure 5B:
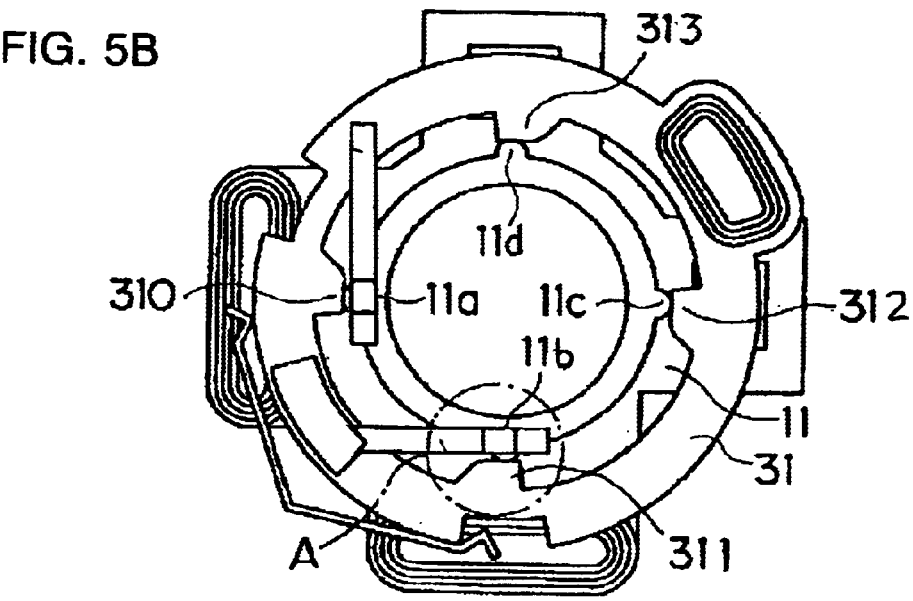
Figure 5C:
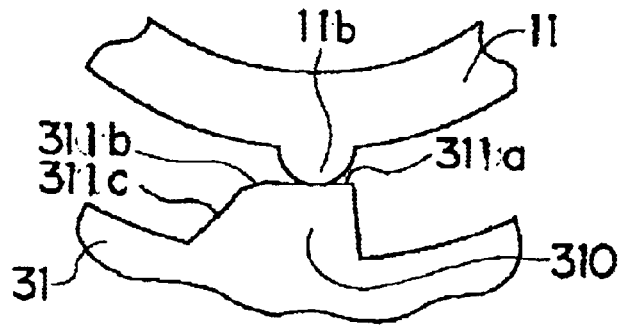

FIGS. 5A and 5B illustrate the locking mechanism achieved in the third embodiment. FIG. 5A shows the locking mechanism in the lock-released state, FIG. 5B shows it in the locked state and FIG. 5C presents an enlargement of the area A in FIG. 5B, in which the bias spring 41X is omitted.

The embodiment differs from the first embodiment only in that movement range restricting portions 310~313 each having a gently inclined surface and a steeply inclined surface are provided instead of the movement range restricting portions 31a~31d and, for this reason, an explanation of the other identical features is omitted.

The movement range restricting portions 310~313 each include a gently inclined surface and a steeply inclined surface. Since they are identical to one another, the movement range restricting portion 311 is now explained as an example. The movement range restricting portion 311 includes a gently inclined surface 311b, a steeply inclined surface 311c and a locking surface 311a.

The gently inclined surface 311b and the steeply inclined surface 311c constitute inclined guide surfaces where the drive force from the locking VCM is converted to a crive force that moves the movable member 11 into the locking range during a locking operation in which the lock ring 31 moves from the lock-release position to the locking position.

The grade of the gently inclined surface 311b is gentle enough that even if the drive control (particularly centering) of the movable member 11 is implemented by the blur correction VCMs, as the projecting portion 11b comes into contact with the gently inclined surface 311b during the locking operation, the locking VCM is able to move the movable member 11 into the locking range against the drive forces imparted by the blur correction VCMs.

The steeply inclined surface 311c, on the other hand, has a steeper grade than the gently inclined surface 311b. Thus, even when the projecting portion 11b comes into contact with the steeply inclined surface 311c during the locking operation, the movable member 11, which is not being controlled by the blur correction VCMs, can be moved into the locking range against the gravitational force due to its own weight.

Variations

The present invention is not limited to the examples presented in reference to the embodiments above, and it allows for a number of variations and modifications, which are equally within the scope of the present invention.

Figure 6:
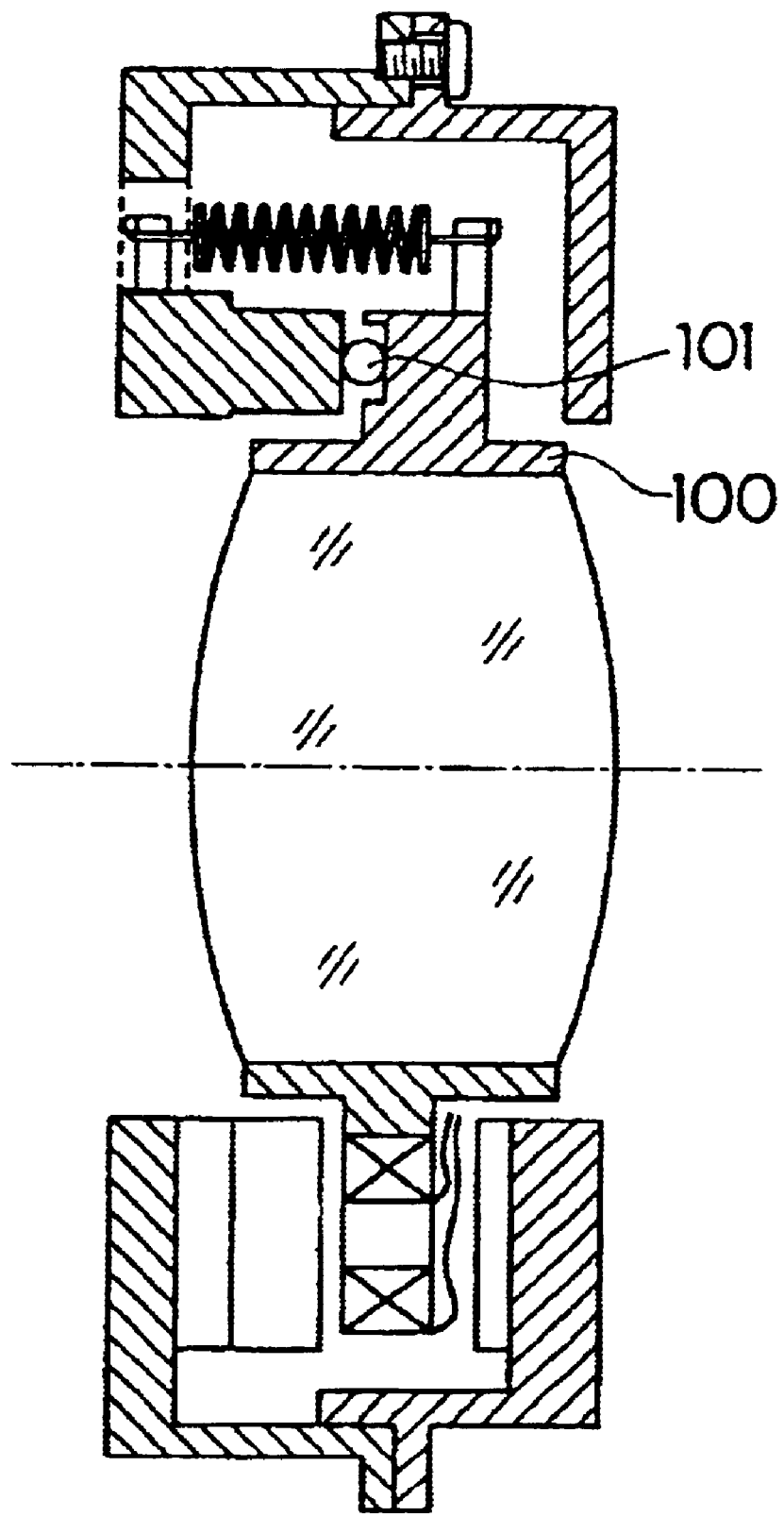
FIG. 6 shows a variation achieved by supporting the movable member with spheres.

For instance, while the movable member 11 is supported by the wires 20 in the embodiments described above, the present invention is not limited to this example and the movable member 11 may be supported with spheres (balls) 101 as shown in FIG. 6. In this case, it is more desirable to apply a force with the bias spring along a direction in which pressure is applied to the spheres 101, since the rolling resistance of the spheres 101 will be increased to disallow ready movement of a movable member 100 even more effectively.

Figure 7:
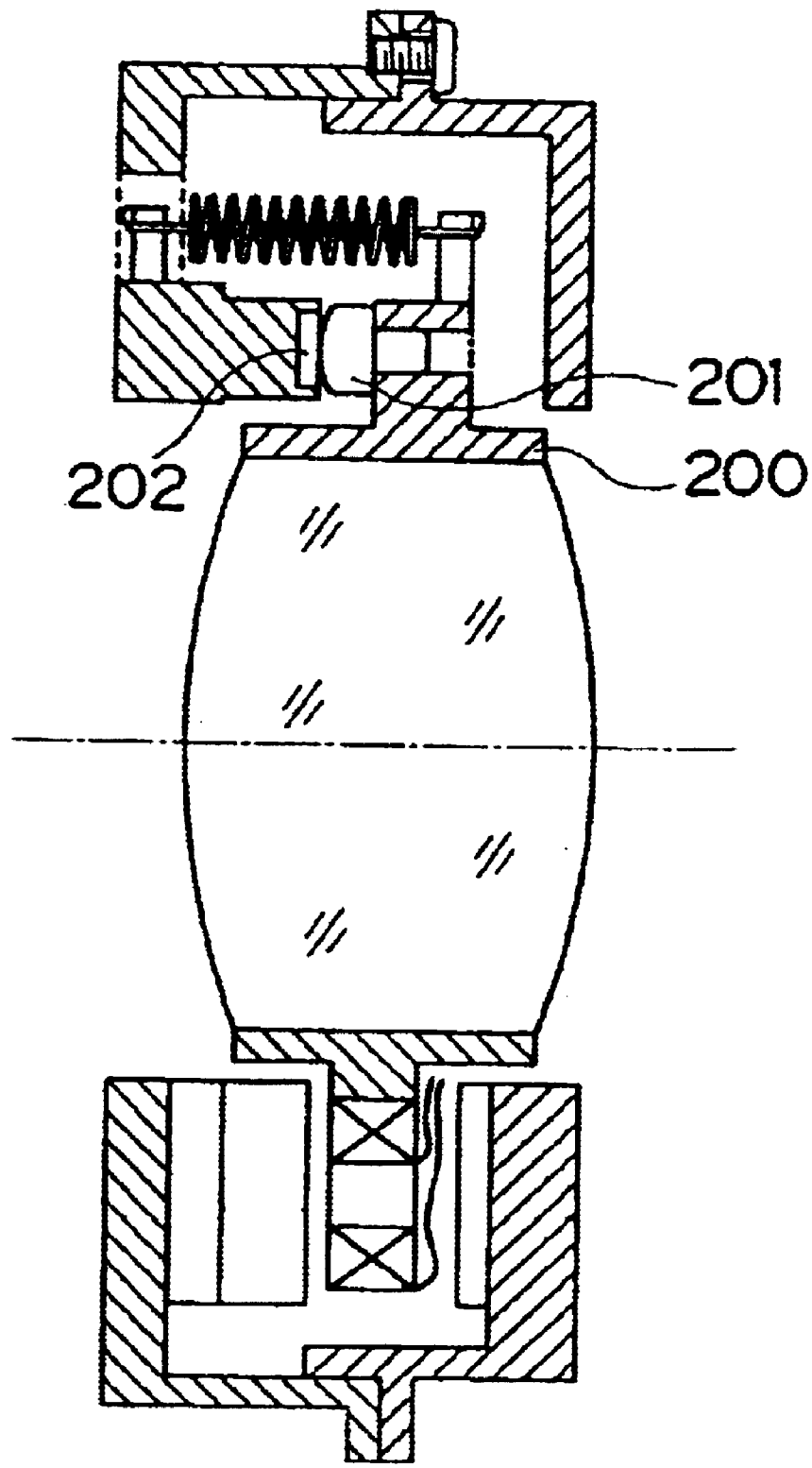
FIG. 7 shows a variation achieved by supporting the movable member at sliding portions.

In addition, as shown in FIG. 7, a movable member 200 may be supported at sliding portions 201 and 202, instead. In this case, it is more desirable to apply a force with the bias spring along the direction in which pressure is applied to the sliding portions 201 and 202, since a higher degree of friction will occur at the sliding portions 201 and 202 to disallow ready movement of the movable member 200 more effectively.

The blur correcting device described above achieve the following advantages. During a locking operation, the movable member can be locked with a high degree of reliability and the quality of the image does not deteriorate even when a vibration occurs due to a shutter release or the like in the photographing apparatus.

In addition, since the pressure member applies pressure to the movable member when the locking member is at the locking position and does not apply any pressure to the movable member when the locking member is at the lock-released position, the movable member can be locked with the pressure member without hindering the movement of the movable member.

The pressure member is fixed to the locking member and moves together with the locking member. The movable member includes a pressure receiving portion where pressure is to be applied. Thus, a switch can be made from the state in which the pressure is applied to the movable member to the state in which no pressure is applied to the movable member and vice versa through the drive of the locking member.

Furthermore, since the pressure member applies pressure to the movable member in the direction along which the wire members supporting the movable member are stretched, the pressure is applied without causing any flexure of the wire members.

Alternatively, as the pressure member applies pressure to the movable member in the direction along which pressure is applied to the sliding portions or the spheres, the moving resistance at the movable member can be increased to achieve an even more reliable lock with the pressure member.

Since the pressure member achieves rigidity, the degree of which is high enough to assure that hardly any deformation is caused within the plane substantially perpendicular to the optical axis by the frictional force occurring at the contact area where it comes in contact with the movable member, the movable member can be reliably locked without the deformation of the pressure member caused by the movement of the movable member.

Also, with the pressure member having at least two leaf springs formed in a substantially strip shape which are set so that the longitudinal directions of the leaf springs constituting the pressure member extend substantially perpendicular to each other, the movable member can be reliably locked by using the pressure member adopting a simple structure.

Alternatively, the pressure member is constituted of a single leaf spring member which includes a contact portion that comes in contact with the movable member, a first arm portion and a second arm portion set along a direction extending substantially perpendicular to the first arm portion and, in this case, the movable member can be reliably locked by using the pressure member constituted of a single leaf spring member.

While an explanation is given above in reference to an embodiment on an example in which the bias springs 41X and 41Y are fixed to the lock ring 31 and they are each placed in contact with the movable member 11 at one end in the locked state, the present invention is not limited to this example. The bias springs 41X and 41Y may be fixed to the movable member 11 instead so that they are each placed in contact with the lock ring 31 at one end thereof in a locked state.

While an explanation is given above in reference to the embodiments on an example in which the present invention is adopted in a camera that photographs still pictures, the present invention is not limited to this example and it may be instead adopted in a video camera that captures dynamic images. In addition, the camera may use film or it may be a digital camera which employs an image capturing element. Namely, the present invention may be adopted in all types of photographing apparatuses that require a blur correcting device.

Furthermore, the mechanism for preventing vibration of the movable member 11 may be provided in an apparatus other than a photographing apparatus. The present invention may be adopted in a mechanism provided to prevent vibration of a movable member in all types of apparatuses. More specifically, the mechanism explained above may be utilized to reliably prevent the slight vibration or the like of a movable member from occurring in a movable member movement restricting mode in an apparatus that can be set to a movable member movement enabling mode or the movable member movement restricting mode.

The above described embodiments are examples, and various modifications can be made without departing from the spirit and scope of the invention.

What is claimed is:

1. A vibration preventing device comprising:
    a movable member capable of moving within a predetermined plane;
    a drive unit that drives the movable member to move within the predetermined plane;
    a restricting member that is set to either a first position at which movement of the movable member within the predetermined plane is physically enabled or to a second position at which the movement of the movable member within the predetermined plane is restricted; and
    a pressure member that further prevents the movement of the movable member within the predetermined plane by applying pressure to the movable member along a direction substantially perpendicular to the predetermined plane while the movement of the movable member within the predetermined plane is restricted by the restricting member.

2. A vibration preventing device according to claim 1, wherein:
the pressure member is constituted of at least two elongated leaf springs; and
longitudinal directions of the two leaf springs are set along different directions from each other.

3. A vibration preventing device according to claim 1, wherein:
the pressure member is constituted of a single leaf spring member; and
the leaf spring member comprises
a contact portion that comes into contact with the movable member,
a first arm portion having one end thereof fixed to the restricting member and another end thereof connected to the contact portion, that functions as a leaf spring, and
a second arm portion having one end thereof fixed to the restricting member and another end thereof connected to the contact portion, that functions as a leaf spring and is set in a direction extending substantially perpendicular to the first arm portion.

4. A vibration preventing device according to claim 1, wherein:
the restricting member is set to the first position or the second position as the restricting member itself moves; and
the pressure member is fixed to the restricting member, is caused to move as the restricting member moves, applies pressure to the movable member when the restricting member is set at the second position, and releases the pressure to the movable member when the restricting member is set at the first position.

5. A vibration preventing device according to claim 1, further comprising:
a blur correction optical system that corrects an image blur by moving along a direction extending substantially perpendicular to an optical axis, wherein:
the blur correction optical system is mounted at the movable member and is driven by the drive unit so as to move along the direction extending substantially perpendicular to the optical axis;
the restricting member allows movement of the blur correction optical system when set at the first position and restricts the movement of the blur correction optical system when set at the second position; and
the pressure member further prevents the movement of the blur correction optical system along the direction extending substantially perpendicular to the optical axis by applying pressure to the movable member along the optical axis while the movement of the blur correction optical system is restricted by the restricting member.

6. A blur correcting device comprising:
a blur correction optical system that corrects an image blur by moving along a direction extending substantially perpendicular to an optical axis;
a movable member that includes the blur correction optical system and moves together with the blur correction optical system;
a blur correction drive unit that drives the movable member; and
a pressure member that applies pressure to the movable member in a direction extending substantially along the optical axis of the blur correction optical system, and switches between a state in which the pressure is applied to the movable member and a state in which no pressure is applied to the movable member by moving within a plane substantially perpendicular to the optical axis.

7. A blur correcting device according to claim 6, further comprising:
a locking member that is capable of moving between a locking position at which a movement range of the movable member is restricted to a locking range narrower than a blur correction control range of the blur correction drive unit and a lock-release position at which the movement of the movable member is not restricted within the locking range, wherein:
the pressure member applies the pressure to the movable member when the locking member is at the locking position and does not apply any pressure to the movable member when the locking member is at the lock-release position.

8. A blur correcting device according to claim 7, wherein:
the pressure member is fixed to the locking member and moves together as the locking member moves; and
the movable member includes a pressure receiving portion that comes in contact with the pressure member when the locking member is at the locking position and is not in contact with the pressure member when the locking member is at the lock-release position.

9. A blur correcting device according to claim 6, wherein:
the movable member is supported by a plurality of wire members; and
the pressure member applies the pressure to the movable member in a direction along which the wire members are stretched.

10. A blur correcting device according to claim 6, wherein:
the movable member is supported by a plurality of sliding portions or a plurality of balls; and
the pressure member applies the pressure to the movable member in a direction along which the pressure is also applied to the sliding portions or the balls.

11. A blur correcting device according to claim 6, wherein:
the pressure member achieves a degree of rigidity high enough to ensure that substantially no deformation is caused within the plane substantially perpendicular to the optical axis by a force resulting from friction occurring at a contact area where the pressure member comes into contact with the movable member.

12. A blur correcting device according to claim 6, wherein:
the pressure member includes at least two substantially strip shaped leaf springs; and
longitudinal directions of the leaf springs constituting the pressure member are set along directions extending substantially perpendicular to each other.

13. A blur correcting device according to claim 7, wherein:
the pressure member is constituted of a single leaf spring member; and
the leaf spring member includes
a contact portion that comes into contact with the movable member, a first arm portion having one end thereof fixed to the locking member and another end thereof connected to the contact portion, which functions as a leaf spring, and a second arm portion having one end thereof fixed to the locking member and another end thereof connected to the contact portion, which functions as a leaf spring and is set in a direction extending substantially perpendicular to the first arm portion.

14. A blur correcting device comprising:

a blur correction optical system that corrects an image blur by moving along a direction extending substantially perpendicular to an optical axis;

a movable member that includes the blur correction optical system and moves together with the blur correction optical system;

a restricting member having a restricting portion for restricting movement of the blur correction optical system along the direction extending substantially perpendicular to the optical axis, that is capable of moving between a restricting position at which the movement of the blur correction optical system is restricted and a non-restricting position at which the movement is not restricted; and a contact member provided at one of the movable member and the restricting member, that assumes a position at which the contact member comes into contact with the movable member or the restricting member where the contact member is not provided when the restricting member moves to the restricting position and assumes a position at which the contact is cleared when the restricting member moves to the non-restricting position.

15. A lens barrel comprising a vibration preventing device according to claim 5.

16. A camera comprising a vibration preventing device according to claim 5.

* * * * *